US009305574B1

United States Patent
Nagasaka et al.

(10) Patent No.: US 9,305,574 B1
(45) Date of Patent: Apr. 5, 2016

(54) NEGATIVE-POLARIZATION SPIN-TORQUE-OSCILLATOR

(71) Applicant: HGST Netherlands B.V., Amsterdam (NL)

(72) Inventors: Keiichi Nagasaka, Isehara (JP); Yo Sato, Odawara (JP); Masato Shiimoto, Odawara (JP); Masashige Sato, Atsugi (JP); Masukazu Igarashi, Kawagoe (JP); Susumu Okamura, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/494,559

(22) Filed: Sep. 23, 2014

(51) Int. Cl.
G11B 5/127 (2006.01)
G11B 5/31 (2006.01)
G11B 5/00 (2006.01)

(52) U.S. Cl.
CPC ........ G11B 5/314 (2013.01); *G11B 2005/0024* (2013.01)

(58) Field of Classification Search
CPC .......... G11B 2005/0024; G11B 5/314; G11B 5/3903; G11B 5/1278; G11B 5/3146; G11B 5/3133; G11B 5/23
USPC .............................................. 360/125.3, 128
See application file for complete search history.

(56) References Cited

U.S. PATENT DOCUMENTS

| | | | |
|---|---|---|---|
| 7,128,988 B2 * | 10/2006 | Lambeth ..................... 428/831.2 |
| 7,724,469 B2 * | 5/2010 | Gao et al. ................... 360/125.3 |
| 8,139,322 B2 * | 3/2012 | Yamada et al. ............ 360/125.3 |
| 8,208,219 B2 | 6/2012 | Zhang et al. |
| 8,320,079 B2 | 11/2012 | Iwasaki et al. |
| 8,472,140 B2 | 6/2013 | Yamada et al. |
| 8,547,656 B2 | 10/2013 | Igarashi et al. |
| 2008/0268291 A1 * | 10/2008 | Akiyama et al. .............. 428/812 |
| 2008/0304176 A1 * | 12/2008 | Takagishi et al. ............... 360/86 |
| 2009/0052095 A1 * | 2/2009 | Yamada et al. ................ 360/324 |
| 2009/0080105 A1 * | 3/2009 | Takashita et al. ............... 360/75 |
| 2011/0300409 A1 * | 12/2011 | Yamada et al. ............ 428/815.2 |
| 2012/0113540 A1 * | 5/2012 | Zhang et al. .................... 360/59 |
| 2012/0154952 A1 * | 6/2012 | Yamada et al. .......... 360/125.12 |
| 2013/0070367 A1 | 3/2013 | Igarashi et al. |
| 2013/0271866 A1 | 10/2013 | Sato |
| 2014/0146420 A1 * | 5/2014 | Shimizu et al. ............ 360/234.7 |
| 2014/0204487 A1 * | 7/2014 | Hase et al. .................... 360/244 |

OTHER PUBLICATIONS

Yoshida et al. "Spin Torque Oscillator with Negative Magnetic Anisotropy Materials for MAMR," Jun. 2010, IEEE Transactions on Magnetics, vol. 46, No. 6, pp. 2466-2469.*

Zhu, et al.; Bias-Field-Free Microwave Oscillator Driven by Perpendicularly Polarized Spin Current; IEEE Transactions on Magnetics; vol. 42, Issue 10; dated Sep. 25, 2006; 2 pages.

(Continued)

*Primary Examiner* — Will J Klimowicz
(74) *Attorney, Agent, or Firm* — Patterson & Sheridan, LLP

(57) ABSTRACT

Embodiments disclosed herein generally relate to a MAMR head. The MAMR head includes an STO. The STO has a first magnetic layer, a second magnetic layer and an interlayer disposed between the first and second magnetic layers. One of the first and second magnetic layers is made of a negative polarization material while the other magnetic layer is made of a positive polarization material. As a result, the magnetizations in the first and second magnetic layers are in the same direction when in oscillation, which suppresses the partial cancellation of the magnetizations in the first and second magnetic layers and strengthens the AC magnetic field.

12 Claims, 3 Drawing Sheets

(56) References Cited

OTHER PUBLICATIONS

Yoshida, et al.; Spin Torque Oscillator with Negative Magnetic Anisotropy Materials for MAMR; IEEE Transactions on Magnetics; vol. 46, No. 6; dated Jun. 2010; 4 pages.

Igarashi, et al.; Oscillation Feature of Planar Spin-Torque Oscillator for Microwave-Assisted Magnetic Recording; IEEE Transactions on Magnetics; dated Nov. 2010; 2 pages.

U.S. Appl. No. 14/040,151 in the name of Furukawa, et al.; entitled MAMR Head with Recessed STO; filed Sep. 27, 2013; 19 pages.

* cited by examiner

NEGATIVE-POLARIZATION SPIN-TORQUE-OSCILLATOR

BACKGROUND

1. Field

Embodiments disclosed herein generally relate to a magnetic disk device employing a microwave assisted magnetic recording head.

2. Description of the Related Art

Over the past few years, microwave assisted magnetic recording (MAMR) has been studied as a recording method to improve the areal density of a magnetic read/write device, such as a hard disk drive (HDD). MAMR enabled magnetic recording heads utilize a spin torque oscillator (STO) for generating a microwave (high frequency AC magnetic field). When the magnetic field from the write head is applied and current is conducted to the STO, the STO oscillates and may provide an AC magnetic field to the recording medium. The AC magnetic field may reduce the coercive force of the recording medium, thus high quality recording by MAMR may be achieved. Typically the STO includes a spin polarization layer (SPL), a field generation layer (FGL) and an interlayer disposed between the SPL and the FGL. The STO generates high frequency magnetic fields, or microwaves, as a result of the transfer of spin torque from the SPL through the interlayer to the FGL, and the in-plane high speed rotation of the magnetization of the FGL serves as the in-plane free layer.

In some designs, the magnetization direction in the SPL is perpendicular to the magnetization direction in the FGL, also known as the T-mode oscillation mode. The T-mode oscillation utilizes reflect torque, which has low efficiency. In other designs, the magnetization direction in the SPL is anti-parallel to the magnetization direction in the FGL, also known as the AF-mode oscillation mode. Anti-parallel means that the magnetization directions in the SPL and the FGL are parallel but in opposite directions. AF-mode oscillation utilizes both reflect torque and direct torque so oscillation with small bias current can be obtained. However, anti-parallel magnetization directions may partially cancel the magnetizations in the SPL and FGL, leading to weak AC magnetic field. Therefore, there is a need in the art for an improved recording head for MAMR.

SUMMARY

Embodiments disclosed herein generally relate to a MAMR head. The MAMR head includes an STO. The STO has a first magnetic layer, a second magnetic layer and an interlayer disposed between the first and second magnetic layers. One of the first and second magnetic layers is made of a negative polarization material while the other magnetic layer is made of a positive polarization material. As a result, the magnetizations in the first and second magnetic layers are in the same direction, which suppresses the partial cancellation of the magnetizations in the first and second magnetic layers and strengthens the AC magnetic field.

In one embodiment, an STO is disclosed. The STO includes a first magnetic layer, and the first magnetic layer includes a negative polarization material. The STO further includes a second magnetic layer, and the second magnetic layer includes a positive polarization material. The STO further includes a first interlayer disposed between the first magnetic layer and the second magnetic layer.

In another embodiment, a MAMR system is disclosed. The MAMR system includes an STO, and the STO includes a first magnetic layer, a second magnetic layer, and a first interlayer disposed between the first magnetic layer and the second magnetic layer. One of the first and second magnetic layers includes a negative polarization material and one of the first and second magnetic layers includes a positive polarization material.

In another embodiment, a hard disk drive is disclosed. The hard disk drive includes a magnetic media, a magnetic read head, and a magnetic write head. The magnetic write head includes an STO, and the STO includes a first magnetic layer. The first magnetic layer includes a negative polarization material. The STO further includes a second magnetic layer, and the second magnetic layer includes a positive polarization material. The STO further includes a first interlayer disposed between the first magnetic layer and the second magnetic layer.

BRIEF DESCRIPTION OF THE DRAWINGS

So that the manner in which the above recited features can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s).

Embodiments disclosed herein generally relate to a MAMR head. The MAMR head includes an STO. The STO has a first magnetic layer, a second magnetic layer and an interlayer disposed between the first and second magnetic layers. One of the first and second magnetic layers is made of a negative polarization material while the other magnetic layer is made of a positive polarization material. As a result, the magnetizations in the first and second magnetic layers are in the same direction, which suppresses the partial cancellation of the magnetizations in the first and second magnetic layers and strengthens the AC magnetic field.

Figure 1:
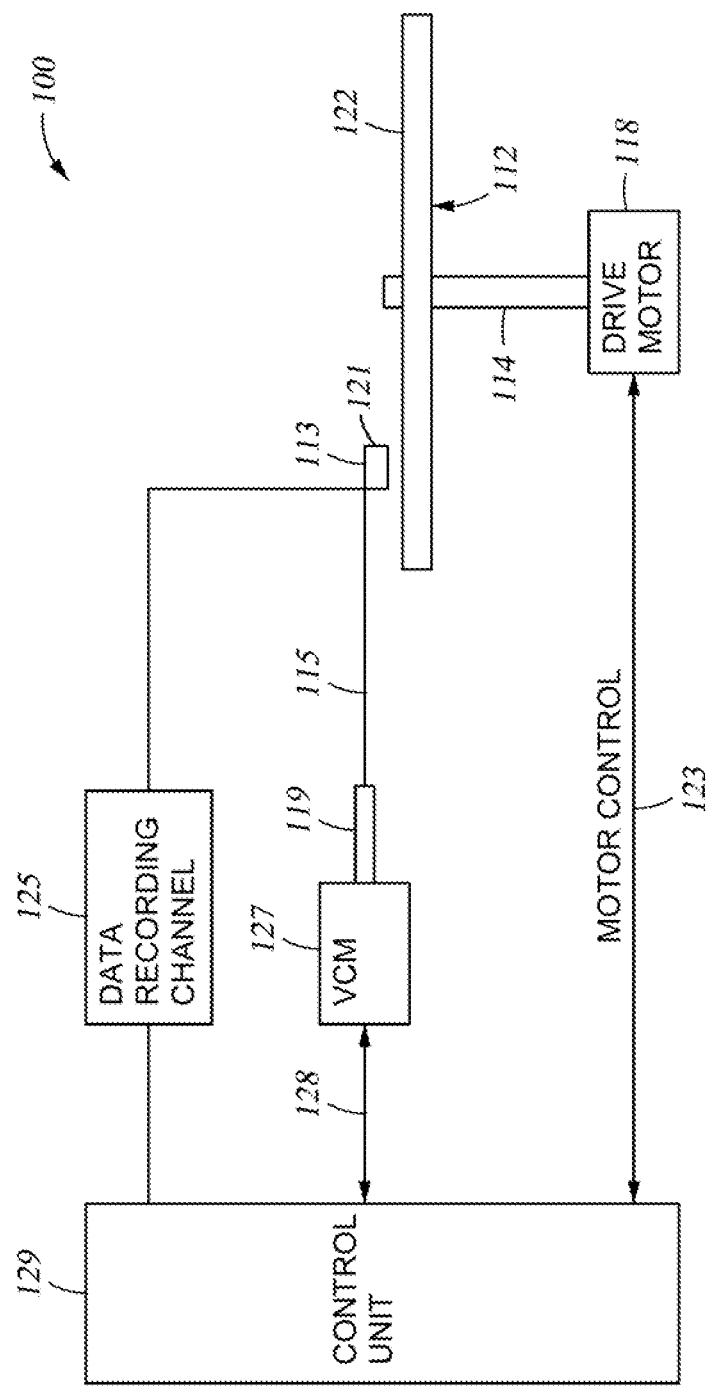
FIG. 1 illustrates a disk drive system, according to embodiments described herein.

FIG. 1 illustrates a disk drive 100 according to embodiments described herein. As shown, at least one rotatable magnetic media, such as a magnetic disk 112, is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include an STO for applying an AC magnetic field to the disk surface 122. As the magnetic disk rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of the MAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
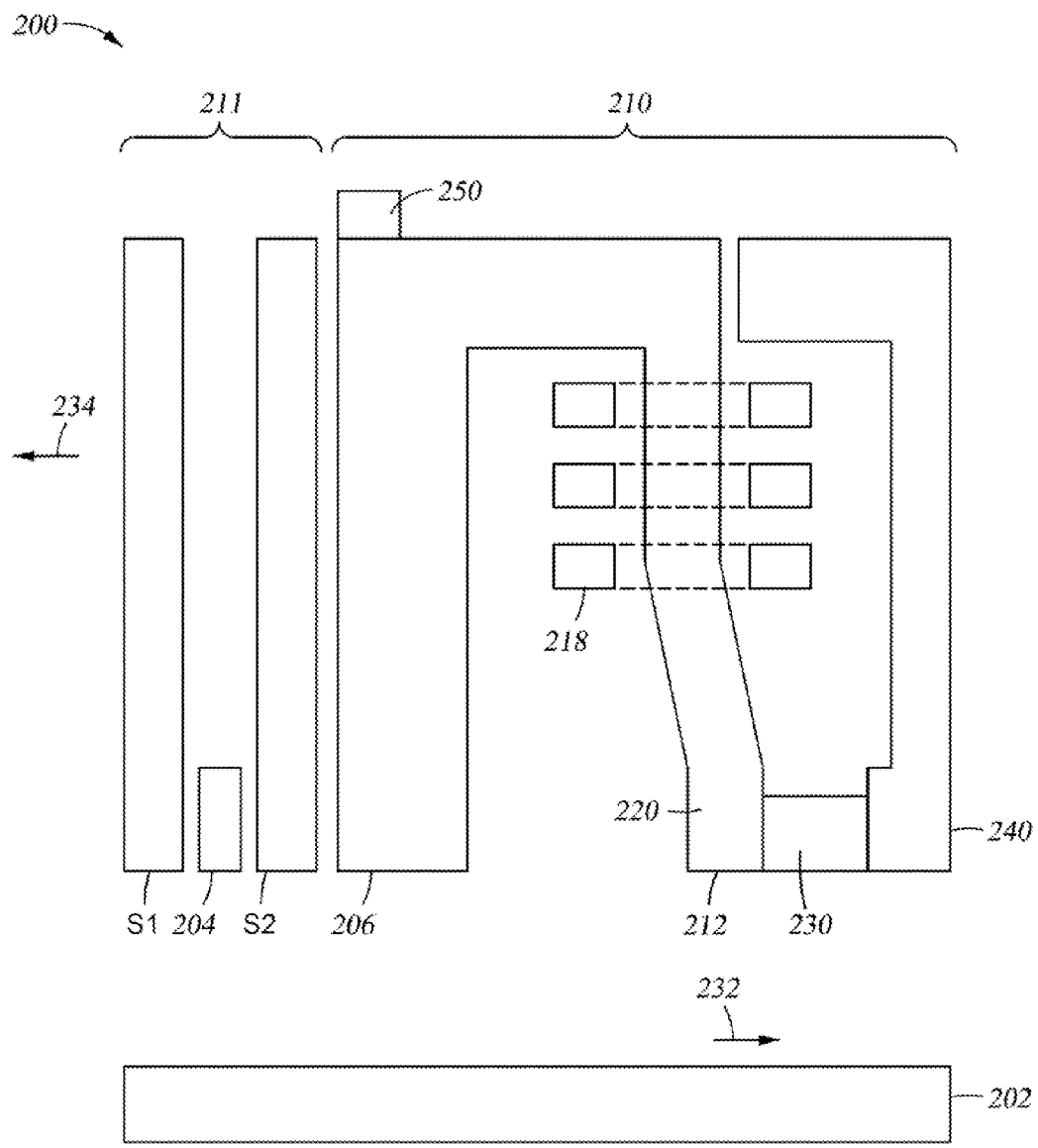
FIG. 2 is a cross sectional view of a MAMR read/write head and magnetic disk of the disk drive system of FIG. 1, according to embodiments described herein.

FIG. 2 is a fragmented, cross sectional side view through the center of a MAMR read/write head 200 facing a magnetic disk 202. The read/write head 200 and magnetic disk 202 may correspond to the magnetic head assembly 121 and magnetic disk 112, respectively in FIG. 1. The read/write head 200 includes a media facing surface (MFS) 212, such as an ABS, a magnetic write head 210 and a magnetic read head 211, and is mounted such that the MFS 212 is facing the magnetic disk 202. In FIG. 2, the disk 202 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 202 are detectable by the MR (or MTJ) sensing element 204 as the recorded bits.

The write head 210 includes a return pole 206, a main pole 220, a trailing shield 240, an STO 230 disposed between the main pole 220 and the trailing shield 240, and a coil 218 that excites the main pole 220. A recording magnetic field is generated from the main pole 220 and the trailing shield 240 helps making the magnetic field gradient of the main pole 220 steep. The main pole 220 may be a magnetic material such as a CoFe alloy. In one embodiment, the main pole 220 has a saturated magnetization (Ms) of 2.4 T and a thickness of about 300 nanometers (nm). The trailing shield 240 may be a magnetic material such as NiFe alloy. In one embodiment, the trailing shield 240 has an Ms of about 1.2 T.

The main pole 220, the trailing shield 240 and the STO 230 all extend to the MFS 212, and the STO 230 disposed between the main pole 220 and the trailing shield 240 is electrically coupled to the main pole 220 and the trailing shield 240. The STO 230 may be surrounded by an insulating material (not shown) in a cross-track direction (into and out of the paper). During operation, the STO 230 generates an AC magnetic field that travels to the magnetic disk 202 to lower the coercivity of the region of the magnetic disk 202 adjacent to the STO 230. The write head 210 further includes a heater 250 for adjusting the distance between the read/write head 200 and the magnetic disk 202. The location of the heater 250 is not limited to above the return pole 206, as shown in FIG. 2. The heater 250 may be disposed at any suitable location.

Figure 3A:
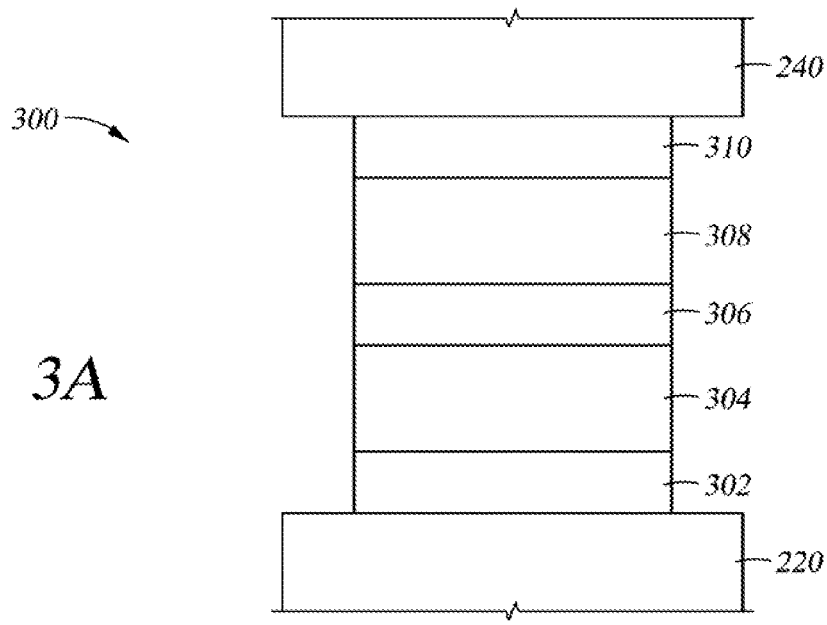
FIGS. 3A-3B are media facing surface views of an STO according to embodiments described herein.
Figure 3B:
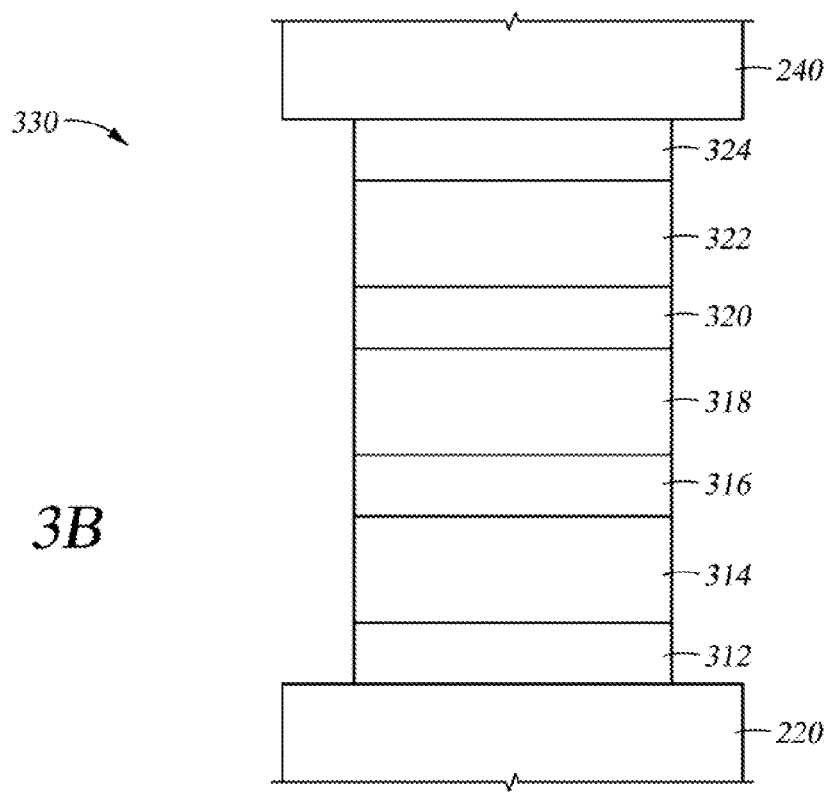

FIGS. 3A-3B are MFS views of an STO 300 according to embodiments described herein. The STO 300 may be the STO 230 shown in FIG. 2. As shown in FIG. 3A, the STO 300 may be disposed between the main pole 220 and the trailing shield 240. The STO 300 may include a first magnetic layer 304, a second magnetic layer 308 and an interlayer 306 disposed between the first magnetic layer 304 and the second magnetic layer 308. The interlayer 306 may be a non-magnetic metal having long spin diffusion length. The first magnetic layer 304 may be an SPL and the second magnetic layer 308 may be an FGL, or vice versa. Conventionally, both the SPL and FGL include positive polarization materials. Positive polarization materials have same magnetization and spin directions. With the SPL and FGL both having positive polarization materials, the magnetizations of the SPL and FGL are both in oscillation with anti-parallel configuration in some proper conditions by passing an electrical current through the materials. This is called AF-mode oscillation. This anti-parallel magnetization oscillation partially cancels the magnetizations of the SPL and FGL, leading to weaker AC magnetic field generated by the STO. To suppress the cancellation of the magnetizations of the SPL and FGL and to strengthen the AC magnetic field generated by the STO, a negative polarization material may be used for one of the SPL and FGL, while the other layer includes a positive polarization material. Negative polarization materials have opposite directions of magnetization and spin. With one of the SPL and FGL being positive polarization material and the other being negative polarization material, the magnetization directions of the SPL and FGL in oscillation are parallel, meaning the magnetization directions of the SPL and FGL are the same when in oscillation with an electrical current is passing through the materials. Parallel magnetization directions of the SPL and FGL suppress the cancellation of magnetizations in the SPL and FGL, which leads to a strengthened AC magnetic field generated by the STO 300.

In one embodiment, the first magnetic layer 304 is an SPL which includes a negative polarization material and the second magnetic layer 308 is an FGL which includes a positive polarization material. In another embodiment, the first magnetic layer 304 is an SPL which includes a positive polarization material and the second magnetic layer 308 is an FGL which includes a negative polarization material. In another embodiment, the first magnetic layer 304 is an FGL which includes a positive polarization material and the second magnetic layer 308 is an SPL which includes a negative polarization material. In another embodiment, the first magnetic layer 304 is an FGL which includes a negative polarization material and the second magnetic layer 308 is an SPL which includes a positive polarization material. Examples of negative polarization materials include: FeCr having five to thirty five atomic percent of Cr; CoCr having five to twenty five atomic percent of Cr; NiCr having five to ten atomic percent of Cr; FeV having ten to twenty atomic percent of V; CoMn having five to ten atomic percent of Mn; and any magnetic material containing these materials. Examples of positive polarization materials include Fe, Co, Ni and alloys thereof. Examples of at least a portion of the interlayer 306 adjacent the magnetic layer having negative polarization includes Cr and alloys thereof.

The STO 300 may include an underlayer 302 disposed between the main pole 220 and the first magnetic layer 304 and a cap layer 310 disposed between the trailing shield 240 and the second magnetic layer 308, as shown in FIG. 3A. The underlayer 302 and the cap layer 310 may be electroconductive metal materials. In one embodiment, the underlayer 302 includes Ta and the cap layer 310 includes Cr. In one embodiment, the cap layer 310 is disposed over the second magnetic layer 308, the second magnetic layer 308 is disposed over the interlayer 306, the interlayer 306 is disposed over the first magnetic layer 304, and the first magnetic layer 304 is disposed over the underlayer 302.

FIG. 3B is a MFS view of an STO 330 according to another embodiment. The STO 330 may be the STO 230 shown in FIG. 2. The STO 330 may include a first magnetic layer 314, a second magnetic layer 318, a third magnetic layer 322, a first interlayer 316 and a second interlayer 320. The first interlayer 316 may be disposed between the first magnetic layer 314 and the second magnetic layer 318, and the second interlayer 320 may be disposed between the second magnetic layer 318 and the third magnetic layer 322. The interlayers 316, 320 may be a non-magnetic metal having long spin diffusion length. The first magnetic layer 314 may be an SPL, the second magnetic layer 318 may be an FGL and the third magnetic layer 322 may be another SPL. In this configuration, both AF-mode oscillation and another oscillation mode in which the SPL magnetization stays perpendicular to the film plane, called T-mode oscillation, may be utilized.

In one embodiment, the first magnetic layer 314 may include a negative polarization material, the second magnetic layer 318 may include a positive polarization material and the third magnetic layer 322 may include a positive polarization material. In this configuration, the first magnetic layer 314 and the second magnetic layer 318 utilize AF-mode oscillation and the second magnetic layer 318 and the third magnetic layer 322 utilize T-mode oscillation. In another embodiment, the first magnetic layer 314 may include a positive polarization material, the second magnetic layer 318 may include a positive polarization material and the third magnetic layer 322 may include a negative polarization material. In this configuration, the first magnetic layer 314 and the second magnetic layer 318 utilize T-mode oscillation and the second magnetic layer 318 and the third magnetic layer 322 utilize AF-mode oscillation. Both configurations utilize two SPL layers, since both the first magnetic layer 314 and the third magnetic layer 322 may be SPL. The dual-SPL structure improves spin torque efficiency which leads to improved oscillation state. To further strengthen the AC magnetic field generated by the STO 330, at least one of the three magnetic layers 314, 318, 322 may include negative polarization material and at least one of the three magnetic layers 314, 318, 322 may include positive polarization material. In one embodiment, at least one of the first and third magnetic layers 314, 322 includes negative polarization material and the second magnetic layer 318 includes positive polarization material. In other words, at least one SPL includes negative polarization material and the FGL includes positive polarization material, and the SPL having negative polarization material and the FGL having positive polarization material utilize AF-mode oscillation. As a result, the magnetization directions of the SPL having negative polarization material and the FGL having positive polarization material are the same, i.e., the magnetization directions of the SPL and the FGL are parallel. Parallel magnetization directions helps suppressing cancellation of magnetization in the SPL and FGL, which leads to a stronger AC magnetic field generated by the STO 330.

The STO 330 may include an underlayer 312 disposed between the main pole 220 and the first magnetic layer 314 and a cap layer 324 disposed between the trailing shield 240 and the third magnetic layer 322, as shown in FIG. 3B. The underlayer 312 and the cap layer 324 may be the same as the underlayer 302 and the cap layer 310 described in FIG. 3A. In one embodiment, the cap layer 324 may be disposed over the third magnetic layer 322, the third magnetic layer 322 may be disposed over the second interlayer 320, the second interlayer 320 may be disposed over the second magnetic layer 318, the second magnetic layer 318 may be disposed over the first interlayer 316, the first interlayer 316 may be disposed over the first magnetic layer 314, and the first magnetic layer 314 may be disposed over the underlayer 312.

In summary, a MAMR enabled magnetic head is disclosed. The MAMR head includes an STO disposed between a main pole and a trailing shield. The STO includes at least one SPL and one FGL, and at least one of the layers includes negative polarization material and at least one of the layers includes positive polarization material. The configuration allows the magnetization directions of the SPL and FGL to be parallel, which suppressing the cancellation of magnetizations of the SPL and FGL. In turn, the AC magnetic field generated by the STO is strengthened.

While the foregoing is directed to exemplary embodiments, other and further embodiments of the disclosure may be devised without departing from the basic scope thereof, and the scope thereof is determined by the claims that follow.

What is claimed is:
1. A spin torque oscillator, comprising:
   a first magnetic layer, wherein the first magnetic layer comprises a negative polarization material;
   a second magnetic layer, wherein the second magnetic layer comprises a positive polarization material;
   a third magnetic layer, wherein the third magnetic layer comprises a negative polarization material;
   a first interlayer disposed between the first magnetic layer and the second magnetic layer; and
   a second interlayer disposed between the second magnetic layer and the third magnetic layer.

2. The spin torque oscillator of claim 1, further comprising an underlayer and a cap layer.

3. The spin torque oscillator of claim 2, wherein the first magnetic layer is a spin polarization layer, the second magnetic layer is a field generation layer, and the third magnetic layer is a spin polarization layer, and wherein the cap layer is disposed over the third magnetic layer, the third magnetic layer is disposed over the second interlayer, the second interlayer is disposed over the second magnetic layer, the second magnetic layer is disposed over the first interlayer, the first interlayer is disposed over the first magnetic layer, and the first magnetic layer is disposed over the underlayer.

4. The spin torque oscillator of claim 1, wherein the negative polarization material comprises a material selected from the group consisting of: FeCr having five to thirty five atomic percent of Cr; CoCr having five to twenty five atomic percent of Cr; NiCr having five to ten atomic percent of Cr; FeV having ten to twenty atomic percent of V; CoMn having five to ten atomic percent of Mn; and any magnetic material containing FeCr, CoCr, NiCr, FeV, or CoMn.

5. The spin torque oscillator of claim 1, wherein the positive polarization material comprises a material selected from the group consisting of Fe, Co, Ni and alloys thereof.

6. The spin torque oscillator of claim 1, wherein at least a portion of the first interlayer adjacent the first magnetic layer comprises a material selected from the group consisting of Cr and alloys thereof.

7. A microwave assisted magnetic recording system, comprising:
a spin torque oscillator, wherein the spin torque oscillator comprises:
a first magnetic layer;
a second magnetic layer;
a third magnetic layer;
a first interlayer disposed between the first magnetic layer and the second magnetic layer; and
a second interlayer disposed between the second magnetic layer and the third magnetic layer, wherein two of the first, second and third magnetic layers comprises a negative polarization material and one of the first, second, and third magnetic layers comprises a positive polarization material.

8. The microwave assisted magnetic recording system of claim 7, wherein the spin torque oscillator further comprises an underlayer and a cap layer.

9. The microwave assisted magnetic recording system of claim 8, wherein the cap layer is disposed over the third magnetic layer, the third magnetic layer is disposed over the second interlayer, the second interlayer is disposed over the second magnetic layer, the second magnetic layer is disposed over the first interlayer, the first interlayer is disposed over the first magnetic layer, and the first magnetic layer is disposed over the underlayer.

10. The microwave assisted magnetic recording system of claim 9, wherein the first magnetic layer is a spin polarization layer and comprises a positive polarization material, the second magnetic layer is a field generation layer and comprises a positive polarization material, and the third magnetic layer is a spin polarization layer and comprises a negative polarization material.

11. A hard disk drive, comprising:
a magnetic media;
a magnetic read head; and
a magnetic write head, wherein the magnetic write head comprises a spin torque oscillator, wherein the spin torque oscillator comprises:
a first magnetic layer, wherein the first magnetic layer comprises a negative polarization material;
a second magnetic layer, wherein the second magnetic layer comprises a positive polarization material;
a third magnetic layer;
a first interlayer disposed between the first magnetic layer and the second magnetic layer; and
a second interlayer disposed between the second magnetic layer and the third magnetic layer, wherein two of the first, second and third magnetic layers comprises a negative polarization material and one of the first, second, and third magnetic layers comprises a positive polarization material.

12. The hard disk drive of claim 11, wherein the spin torque oscillator further comprises an underlayer and a cap layer.

* * * * *